3,223,477
METHOD FOR PREPARING ALKALI METAL AND ALKALINE EARTH METAL BROMITES

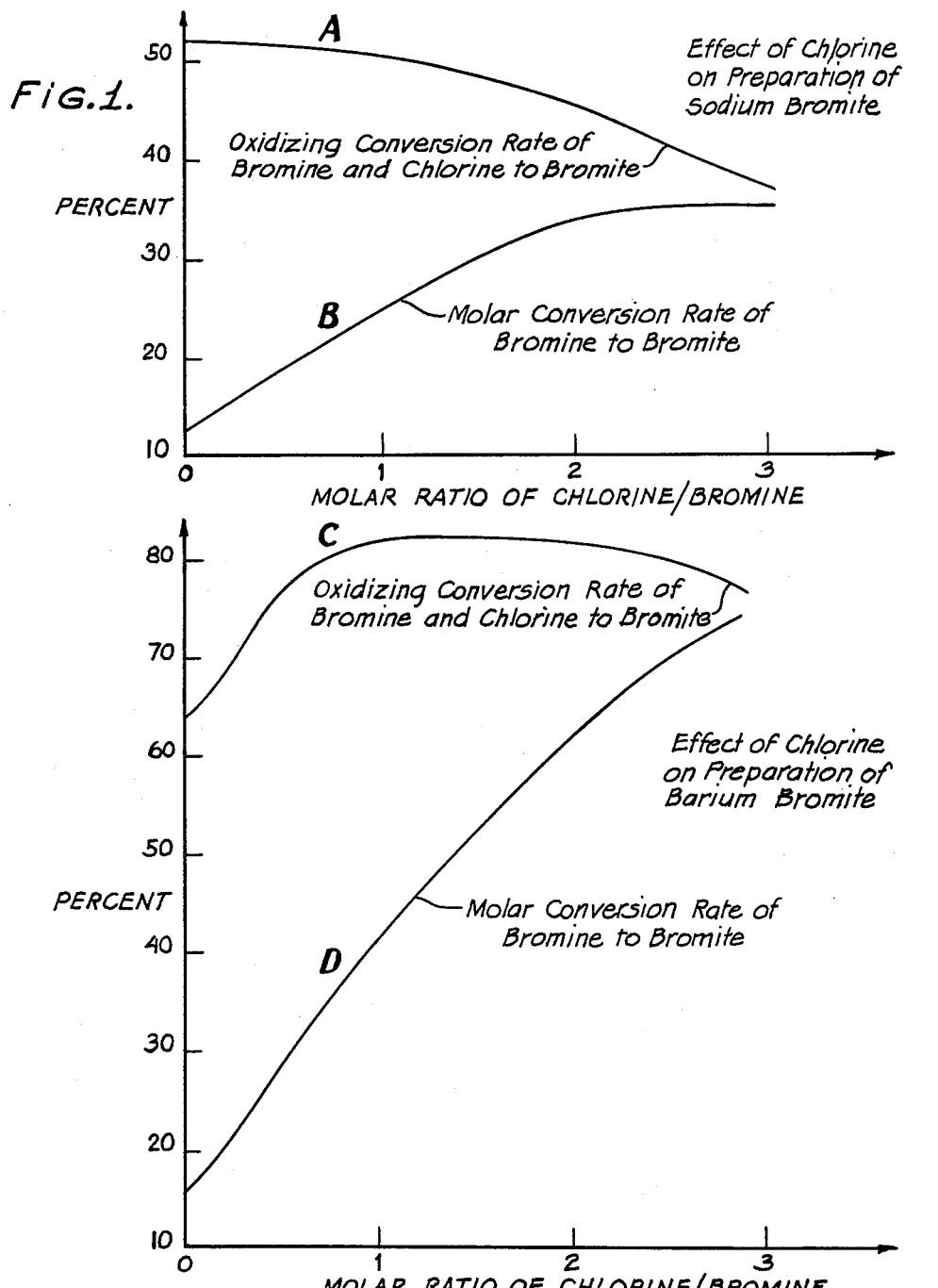

Jean Breiss, Rueil-Malmaison, Rene Kircher, Argenteuil, and Jean-Pierre Zimmermann, Cormeilles-en-Parisis, France, assignors to Societe d'Etudes Chimiques pour l'Industrie et l'Agriculture (SECPIA), Paris, France
Filed June 12, 1962, Ser. No. 201,997
Claims priority, application France, July 20, 1961, 868,455
8 Claims. (Cl. 23—85)

This invention relates to an improved process for the production of alkali metal and alkaline earth bromites, particularly to a process wherein the conversion of bromine to bromite is increased by the technique of adding chlorine.

In U.S. Patent 3,085,854 of April 16, 1963, there is described a process for preparing concentrated solutions of alkali metal and alkaline earth metal bromites from which it is possible to prepare bromites in the crystalline state. In U.S. Patent 3,095,267 of June 25, 1963, there is described a simpler method for obtaining a solid alkaline earth metal bromite directly from an aqueous slurry. The methods described in said applications relate to the production of bromite solutions or slurries obtained by spontaneous conversion of concentrated hypobromite aqueous solutions or slurries when operating with certain predetermined ranges of pH and temperature, and stopping the conversion process at the point where the bromite concentration is at its peak value, by suddenly raising the pH.

These processes, although highly successful for producing crystalline bromites, require a relatively large excess of bromine for each mol of bromite that is synthesized. For example, when preparing sodium bromite by the method of application 654,041 from a sodium hydroxide solution, containing 30% by weight of bromine, the conversion rate of bromine to bromite is only 13 mol percent.

Therefore, it is the principal object of this invention to provide an improved process wherein the conversion rate of bromite to alkali metal and alkaline earth bromites is significantly increased.

Another object of this invention is to provide a process wherein there is an improvement in the yield of alkaline earth bromites when produced from suspensions of alkaline earth hydroxides.

These and other objects and advantages of the present invention will become apparent upon further study of the specification and appended claims.

To accomplish the objects of this invention, it has been unexpectedly discovered that the use of chlorine results in a marked increase in the rate of conversion of bromine to bromite. Specifically, the process of this invention comprises the novel step of introducing both bromine and chlorine in an aqueous solution or suspension of the base corresponding to the bromite contemplated. Contrary to expectations, the addition of chlorine surprisingly has no significant deleterious effect on the stability of the bromite salts under the operating conditions of this invention. The proportions are preferably selected in such amounts that for $x$ mols of bromine and $y$ mols of chlorine, about $2(x+y)$ gram equivalents of the base are employed, and for $x$ mols of bromine, not more than about $4x$ mols of chlorine are employed.

After this latter step, the hypobromite conversion process is conducted in the same manner as disclosed in the two previously cited applications.

Referring to the drawings; FIGURE 1 is a graph which shows the effect of an increasing chlorine to bromine ratio on the conversion of bromine to sodium bromite, and on the conversion of the oxidizing power of the initial solution to bromite oxidizing power. FIGURE 2 is similar to FIGURE 1, except that the data is pertinent to the conversion of barium salts instead of sodium salts.

The mixture obtained by reacting bromine, chlorine and a base is then treated so that a pH of 10–12.5, and a temperature below ambient temperature, preferably at about 0° C., is maintained, the higher the concentration of hypobromite, preferably the higher the pH within said range, the specific pH and temperature being so selected that an approximately maximum conversion of hypobromite to bromite is attained; and then the pH of the thus obtained bromite solution or slurry of bromite is raised so as to stop the conversion of hypobromite to bromite at the aforesaid maximum and simultaneously stabilize the resulting secondary bromite-containing solutions and suspensions.

For a graphical presentation of the effect of adding chlorine, reference is directed to the drawing. In FIGURE 1, directed to the production of sodium bromite from a solution, the abscissa represents the molar ratio of chlorine to bromine in the initial solution, whereas the ordinate is in percent conversion.

Curve A represents the effect of chlorine on the ratio of the oxidizing power of the resultant sodium bromite to the combined oxidizing power of bromine and chlorine in the initial solution. It is apparent that as the amount of chlorine is increased, the conversion of said total oxidizing power into bromite oxidizing power is decreased somewhat, thereby apparently indicating a loss in oxidizing power due to the addition of chlorine.

However, upon referring to Curve B, it is seen that the overall molar conversion of bromine to bromite is markedly increased by the addition of chlorine. Consequently, in view of the fact that bromine is about 15 times as costly as chlorine, it is readily understandable that the slight decrease in the yield of oxidizing power is more than compensated for by the increased conversion rate of bromine to bromite. This unexpected result, of course, is an outstanding economic advantage. For example, when the molar ratio of chlorine to bromine is unity, the rate of conversion of bromite from bromine is increased 92%, whereas there is only a 3.8% drop in the overall oxidizing power of the initial solution; and when the molar ratio of chlorine to bromine is two, the bromite molar conversion is increased to 161% with only an 11.5% decrease in total oxidizing power. It is preferred, therefore, to operate the solution process of the present invention with a chlorine to bromine molar ratio in the range of 1:1 to 3:1, preferably 1.5:1 to 2.5:1.

An even more unexpected result is attained when alkaline earth bromites are prepared from an aqueous suspension of alkaline earth hydroxides. Referring to FIGURE 2, curve C, it is seen that there is obtained an increase in the total oxidizing power in the form of bromite. As the ratio of chlorine to bromine increases from 0 to 1, the conversion of oxidizing power increases from 64 to 81.5%. However, as the ratio becomes greater than one, the conversion decreases, but even at a ratio of 3 mols of chlorine to one mol of bromine, the oxidizing conversion exceeds that obtained in the absence of chlorine.

Curve D of FIGURE 2 illustrates the associated increase in the molar conversion of bromine to barium bromite. In the absence of chlorine, the conversion is only 16%, but as the mol ratio of chlorine to bromine is increased, the molar conversion is also increased, so that at a mol ratio of 3, the molar conversion reaches about 75%, the corresponding increase being 368%, which is obviously a great improvement. It is preferred, therefore, to operate the suspension process of the present invention with a chlorine to bromine molar ratio in the range of 1 to 3, preferably 2 to 3.

With respect to the other variables of the process of this invention, it is preferable to maintain an operating temperature of about 0° C. In addition, when operating with an aqueous solution, it is advantageous to add a selective reducing agent at the termination of the reaction so as to decompose any unconverted hypobromite, the reducing agent preferably being a methyl ketone of the formula $CH_3COR$ wherein R represents H or a hydrocarbon group of 1 to 4 carbon atoms, or a substance yielding methyl ketone upon oxidation. (In the latter case, bromoform is separated, and a stabilized solution is obtained which is either used directly, or to prepare a crystalline bromite.)

Without further analysis, it is believed that one skilled in the art can practice the present invention by merely referring to the preceding description thereof. The following preferred specific embodiments, therefore, are merely presented for purposes of illustration, and are not intended to be limitative of the remainder of the specification and appended claims in any way whatsoever.

*Example 1*

To 47.94 kg. of an aqueous sodium hydroxide solution containing 22.2% of NaOH, are added 6.26 kg. of chlorine, then 7.18 kg. of bromine (corresponding to the molar ratio of chlorine/bromine of 1.97), the solution being kept agitated and cooled. The pH of the solution is adjusted to 11.7 and the temperature maintained at 0° C. After 50 minutes, there is obtained a solution in which 45% of the total oxidizing power is in the form of sodium bromite. To stop the conversion and stabilize the solution, there are added 400 g. of a sodium hydroxide solution containing 47% of NaOH. 854 g. of acetone are then added gradually, the solution being kept agitated and the temperature maintained at −5 to 0° C., the bromoform so obtained being separated from the solution by decantation. 2.88 kg. of bromoform are obtained and 60.8 kg. of a solution containing 15% of available bromine in the form of bromite (corresponding to 195 g./l. of available bromine in the form of bromite). The transformation rate of bromine to bromite was found to be 31.8%. Moreover, 38% of the initial bromine was converted to bromoform.

*Example 2*

To 49.24 kg. of an aqueous sodium hydroxide solution containing 23.4% of NaOH, are added 11 kg. of bromine, then 5.26 kg. of chlorine corresponding to a molar ratio of chlorine/bromine of 1.08. While the reagents are being admitted, the solution is kept agitated and the temperature maintained within the range of −4 to 0° C., and at the end of the operation, the pH of the solution is adjusted to 11.9. The temperature is maintained at −1 to +1° C. for 124 minutes, after which 48.6% of the total oxidizing power of the solution is in the form of sodium bromite. To stop the conversion, 400 g. of a sodium hydroxide solution containing 47% of NaOH are added, and then gradually 728 g. of acetone, the temperature being held within a range of −7 to 0° C. The resulting solution is decanted; yielding 2,395 kg. of a precipitate of bromoform, and 62.45 kg. of a solution containing 16.85% of available bromine in the form of bromite (224 g./l. available bromine in the form of bromite).

23.9% of the initial bromine was converted to sodium bromite and 20.7% to bromoform.

*Example 3*

6.16 kg. of barium hydroxide $Ba(OH)_2 \cdot 8H_2O$, 0.98 kg. of chlorine and 0.92 kg. of bromine (molar ratio of chlorine/bromine of 2.4) are made to react by operating as follows: one half of the amount of barium hydroxide is used to prepare an aqueous slurry with 1.94 kg. of water, then the chlorine is added simultaneously with the second half of barium hydroxide in successive quantities. Then, the bromine is added, the mixture being agitated and cooled all the time. The pH value is adjusted to 10.8 and the slurry is left to evolve spontaneously, the temperature being maintained at 2° C. In the slurry thus obtained, 80% of the total oxidizing power is in the form of barium bromite. The conversion process is then stopped by adding 0.2 kg. of $Ba(OH)_2 \cdot 8H_2O$ and the resulting slurry contains 2.5 kg. of available bromine in the form of bromite which means that 68% of the initial bromine has been converted to bromite.

The slurry is filtered and 5.2 kg. of a solid containing 45.2% of available bromine in the form of barium bromite are obtained.

*Example 4*

307 g. of strontium hydroxide $Sr(OH)_2 \cdot H_2O$, 527 g. water, 106 g. of chlorine and 114 g. of bromine, are made to react by operating as described in Example 3. The pH of the slurry obtained is adjusted to 10.2 and the temperature is maintained within a range of 1 to 3° C., until the strontium bromite concentration has reached its peak value. The bromite yield is then 65% of total oxidizing power. The conversion process is stopped by adding 4 g. of $Sr(OH)_2 \cdot H_2O$ and the resulting slurry contains 228 g. of available bromine in the form of bromite which means that 68% of initial bromine were converted to strontium bromite.

The slurry is filtered and 260 g. of a solid containing 73.8% of available bromine in the form of strontium bromite are obtained.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What is claimed is:

1. In a process for producing a bromite selected from the group consisting of an alkali metal bromite and an alkaline earth metal bromite from an aqueous mixture of the corresponding hypobromite, which process comprises adjusting the pH of said aqueous mixture to a pH of 10–12.5 and adjusting the temperature of said aqueous mixture to a temperature below ambient temperature to attain an approximately maximum conversion of hypobromite to bromite, and then raising the pH of said aqueous mixture so as to stop the conversion of hypobromite to bromite at the aforesaid maximum, and simultaneously stabilize the resulting secondary bromite-containing mixture, the improvement which comprises the preliminary step of introducing both bromine and chlorine into an aqueous alkali mixture of the base corresponding to the bromite contemplated to produce said aqueous mixture of the corresponding hypobromite, the mol ratio of chlorine to bromine being about 1:1 to 3:1.

2. The process of claim 1 wherein the mol ratio of chlorine to bromine is about 1.5:1 to 2.5:1.

3. The process of claim 1 wherein the bromite is an alkaline earth bromite; the aqueous mixture is an aqueous suspension of an alkaline earth hypobromites, and the mol ratio of chlorine to bromine is about 2:1 to 3:1.

4. The process of claim 1 wherein the adjusted temperature is about 0° C.

5. The process of claim 1 wherein the proportion of chlorine to bromine to base are such that for $x$ mols of bromine and $y$ mols of chlorine about $2(x+y)$ equivalents of the base are employed.

6. The process of claim 1, further comprising the step of adding to the stabilized solution of hypobromite and bromite, a methyl ketone of the formula $CH_3COR$ wherein R represents a member of the group consisting of hydrogen, and a hydrocarbon group having 1–4 carbon atoms.

7. The process of claim 1 wherein the aqueous mixture is a solution.

8. The process of claim 1 wherein the aqueous mixture is a suspension.

References Cited by the Examiner

FOREIGN PATENTS 221,140    4/1959    Australia.
1,091,993  11/1960   Germany.

OTHER REFERENCES

Mellor: Comprehensive Treatise on Inorganic and Theoretical Chemistry, vol. 2, pages 255, 256, 587 (1922). Longmans, Green & Co., New York.

BENJAMIN HENKIN, *Primary Examiner*.

GEORGE D. MITCHELL, *Examiner*.